United States Patent
Koo et al.

[11] Patent Number: 6,139,987
[45] Date of Patent: Oct. 31, 2000

[54] BIPOLAR BATTERY

[75] Inventors: Bon-Soon Koo; Heesook Park Kim; Sung-Baek Cho; Jeong-Ja Choi; Jong-Myong Kim, all of Daejeon, Rep. of Korea

[73] Assignee: Agency for Defense Development, Daejon, Rep. of Korea

[21] Appl. No.: 09/217,358

[22] Filed: Dec. 21, 1998

[30] Foreign Application Priority Data

Dec. 27, 1997 [KR] Rep. of Korea ........................ 97-74892

[51] Int. Cl.$^7$ .............................. H01M 2/06; H01M 4/16; H01M 6/02
[52] U.S. Cl. .......................... 429/210; 429/211; 429/212; 429/155; 429/156
[58] Field of Search .................................... 429/210, 211, 429/212, 155, 156

[56] References Cited

U.S. PATENT DOCUMENTS

| | | | |
|---|---|---|---|
| 3,488,220 | 1/1970 | Lyall | 136/10 |
| 5,047,301 | 9/1991 | Adlhart | 429/101 |
| 5,254,415 | 10/1993 | Williams | 429/153 |
| 5,288,566 | 2/1994 | Ginatta | 429/210 |
| 5,605,771 | 2/1997 | Eidler | 429/72 |
| 5,731,102 | 3/1998 | Monahan | 429/112 |
| 5,925,481 | 7/1999 | Monahan | 429/112 |

OTHER PUBLICATIONS

P.G. Russel, F. Goebel, *Journal of Power Sources* 54 (1995) 180–185, "High Rate Lithium/Thionyl Chloride Bipolar Battery Development".

*Primary Examiner*—Maria Nuzzolillo
*Assistant Examiner*—Mark Ruthkosky
*Attorney, Agent, or Firm*—Morrison & Foerster, LLP

[57] ABSTRACT

A bipolar battery includes a plurality of anodes and cathodes alternately stacked and isolated by separators with a through hole being formed at a center portion of each, and with a plurality of insertion holes being formed at peripheral portions of each, an anode connection member and cathode connection member inserted into the insertion holes of the anodes and cathodes, an anode insulation member formed at the bottom of the anode connection member, a cathode insulation member formed on the top of the cathode connection member, an anode contact member facilitating electrical connection of the anodes and an anode connection member, a cathode contact member facilitating electrical connection of the cathodes and a cathode connection member, an outer support member supporting the stacked anodes and cathodes, an electrolyte injection member inserted into the through holes of the anodes, cathodes, and separators for enabling injection of an electrolyte into the stacked anodes and cathodes, and a collector being shared by the cathode of an upper cell and the anode of an lower cell, for thereby easily increasing the current capacity.

5 Claims, 4 Drawing Sheets

BIPOLAR BATTERY

BACKGROUND OF THE INVENTION

1. Field of the Invention

The present invention relates to a bipolar battery, and in particular to an improved bipolar battery which is capable of increasing a current capacity by alternately stacking a plurality of anodes and cathodes in a cell for parallel connections.

2. Description of the Conventional Art

The current capacity of a battery is in proportion to the area of an electrode of the battery. For this reason, a wider area of the electrode is used for fabricating the battery having a large current capacity. Since there is a limitation for increasing the area of the electrode, a battery having a desired current capacity has been fabricated by connecting a plurality of electrodes with a predetermined area in parallel. Then, in order to obtain a predetermined voltage of the battery, the cells with parallel connections in such a manner are connected in series. However, this type of monopolar battery requires a cell case capable of preventing a flow of electrolyte between the cells in order to minimize a current loss due to the flow of the electrolyte between the cells, i.e., inter-cell leakage current. Besides, cell terminals are necessary for implementing a serial connection of the cells, thereby complicating the battery connections and increasing the size of the batteries. In order to overcome the above-described problems, a bipolar batter can be employed, which is capable of obtaining a desired voltage capacity by simply stacking a cell, composed of a cathode, a separator, and an anode on top of a current collector without an additional cell case.

However, in order to increase the current capacity of the bipolar battery, the area of the same should be increased. The conventional bipolar battery will be explained with reference to the accompanying drawings.

FIG. 1 illustrates a structure in which conventional bipolar cells are stacked. As shown therein, a cell is composed of an anode 1 and cathode 3 isolated by a separator 2, an outer ring 4 supporting the cathode 3, the separator 2 and the anode 1, an electrolyte injection hole 5 through which an electrolyte is injected into the cathode 3 and the anode 1, and a current collector 6 stacked underneath the cathode 3. A plurality of the above-described cells are stacked in a manner that the anode 1 of a lower cell and the cathode 3 of an upper cell share a collector 6.

In the bipolar battery, the additional cell case for preventing the flow of the electrolyte between the cells and external wiring for serial connections are not necessary, thereby resulting in a simpler battery design. A bipolar battery with a desired voltage can be fabricated based on the number of the stacked cells.

However, in the conventional bipolar battery, the area of each electrode should be increased for high current capacity. Therefore there is a limitation to fabricate a battery having a larger current capacity.

SUMMARY OF THE INVENTION

Accordingly, it is an object of the present invention to provide a bipolar battery which overcomes the aforementioned problems encountered in the conventional art.

It is another object of the present invention to provide a bipolar battery which is capable of easily increasing the current capacity.

To achieve the above objects, there is provided a bipolar battery which includes a plurality of anodes and cathodes alternately stacked and isolated by separators with a through hole being formed at a center portion of each, and with a plurality of insertion holes being formed at peripheral portions of each, an anode connection member and cathode connection member inserted into the insertion holes of the anodes and cathodes, an anode insulation member formed at the bottom of the anode connection member, a cathode insulation member formed on top of the cathode connection member, an anode contact member facilitating electrical connection of the anodes and an anode connection member, a cathode contact member facilitating electrical connection of the cathodes and a cathode connection member, an outer support member supporting the stacked anodes and cathodes, an electrolyte injection member inserted into the through holes of the anodes, cathodes, and separators and enabling injection of an electrolyte into the stacked anodes and cathodes, and a collector being shared by the cathode of an upper cell and the anode of a lower cell. Therefore, in the present invention, it is possible to obtain a plurality of parallel connections within a cell.

BRIEF DESCRIPTION OF THE DRAWING

The present invention will become better understood with reference to the accompanying drawings which are given only by way of illustration and thus are not limitative of the present invention, wherein.

DETAILED DESCRIPTION OF THE INVENTION

Hereinafter, the bipolar battery according to the present invention will be explained with reference to the accompanying drawings.

Figure 1:
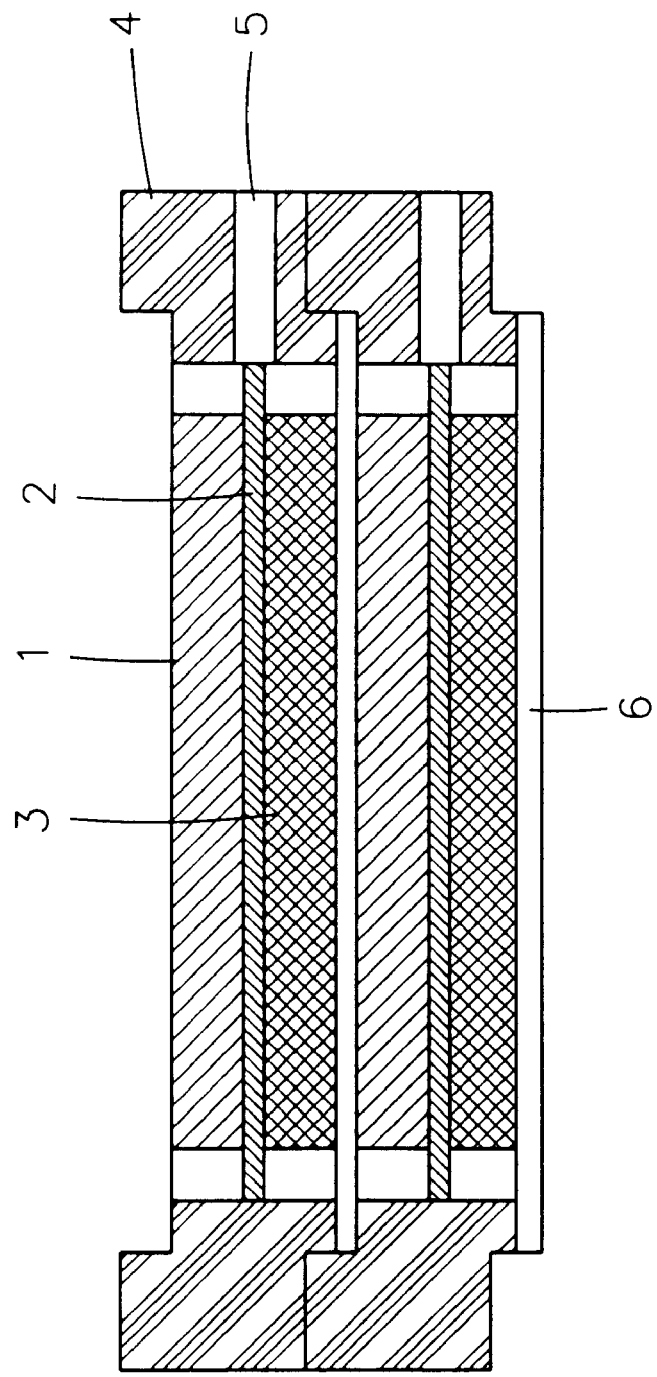
FIG. 1 is a cross-sectional view which illustrates a structure in which conventional bipolar cells are stacked.
Figure 2:
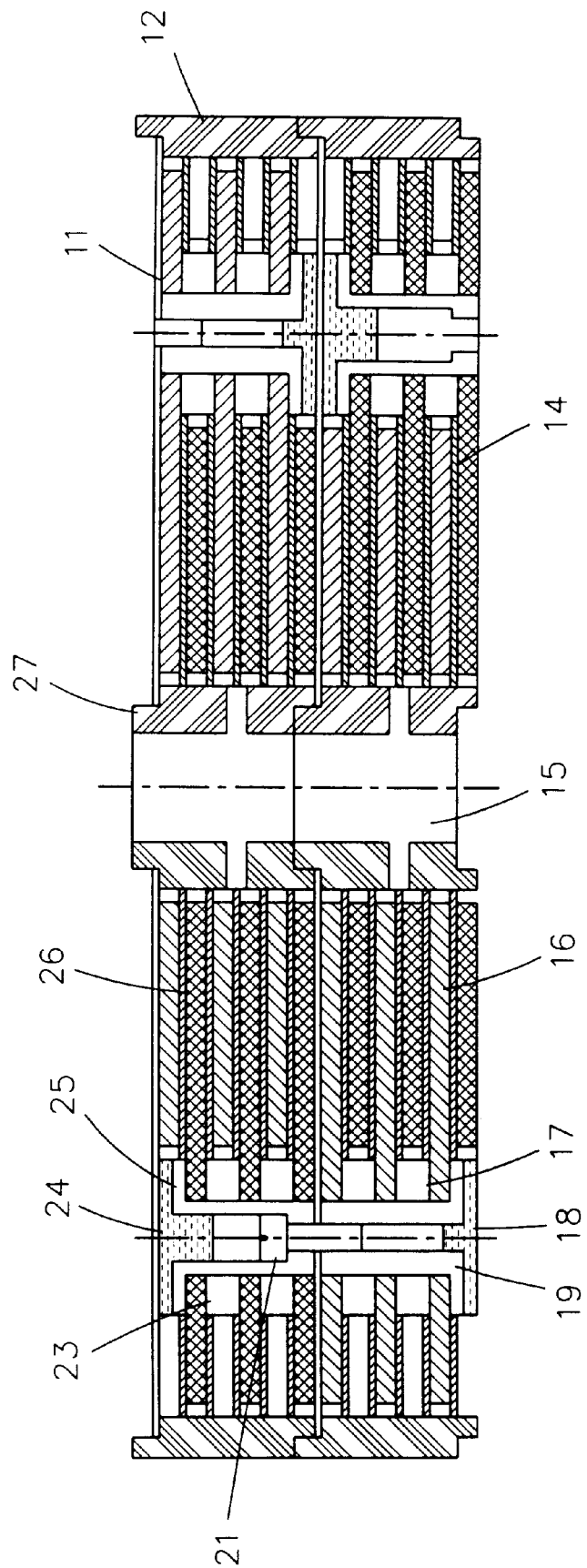
FIG. 2 is a cross-sectional view taken in the direction of an anode pin and a cathode pin in a structure in which a plurality of bipolar cells are connected in series.

FIG. 2 is a cross-sectional view taken in the direction of an anode pin and a cathode pin in a structure in which a plurality of bipolar cells are connected in series. As shown therein, a cell includes a through hole formed at the center portion, a plurality of insertion holes formed at peripheral portions, a plurality of anodes 16 and cathodes 26 which are alternately stacked with a separator 14 therebetween, an anode pin 19 and a cathode pin 25 each having an engaging hole formed at a central portion thereof and inserted into the insertion holes formed at the anodes 16 and the cathodes 26, respectively, for connecting the anodes 16 and the cathodes 26, anode contact rings 17 electrically connecting the anode pin 19 and the anodes 16, cathode contact rings 23 electrically connecting the cathode pin 25 and the cathodes 26, an outer ring 12 supporting the anodes 16, the separators 14, and the cathodes 26 at the outer portions of the same, an electrolyte injection ring 27 disposed in the through hole formed at the center of the anodes 16, the separators 14, and the cathodes 26 and having an electrolyte injection hole 15 through which an electrolyte can be injected into the anodes 16 and the cathodes 26, an anode insulation member 18 and a cathode insulation member 24 preventing the cathode pin 25 and the anode pin 19 in the same cell from being electrically connected with a collector 11 of the cell supported by the electrolyte injection ring 27 and the outer ring 12. A plurality of the above-described cells are stacked and are linked by a connection screw 21 inserted into the engaging hole formed in the cathode pin 25 of the upper cell and the engaging hole formed in the anode pin 19 of the lower cell.

The anode pin 19 is isolated from the lateral surfaces of the plurality of the cathodes 26 by a u-shaped cutout in each of the cathodes, and the cathode pin 25 is isolated from the anodes 16 by a unshaped cutout in each of the anodes for thereby preventing an electrical short circuit. In this structure, the collector 11 contacts with the anode pin 19 of the lower cell and at the same time contacts with the cathode pin 25 of the upper cell. Therefore the collector 11 concurrently serves for the cathode of the upper cell and the anode of the lower cell. The insulation members 18 and 24 prevent the anode pin 19 and the cathode pin 25 of the same cell from being connected with the same collector 11, for thereby preventing an electrical short circuit in the cell.

In this structure, the anodes 16 and the cathodes 26 of the bipolar battery according to the present invention are connected by the anode pin 19 and the cathode pin 25, respectively. Thereby, a plurality of parallel connections are easily obtained to increase the current capacity. In addition, a plurality of bipolar cells can be alternately stacked so that the cathode pin 25 of the upper bipolar cell is placed on top of the anode pin 19 of the lower bipolar cell, and then the two pins 19 and 25 are linked using the connection screw 21 for thereby increasing the voltage.

The bipolar battery according to the present invention will be explained in more detail.

Figure 3:
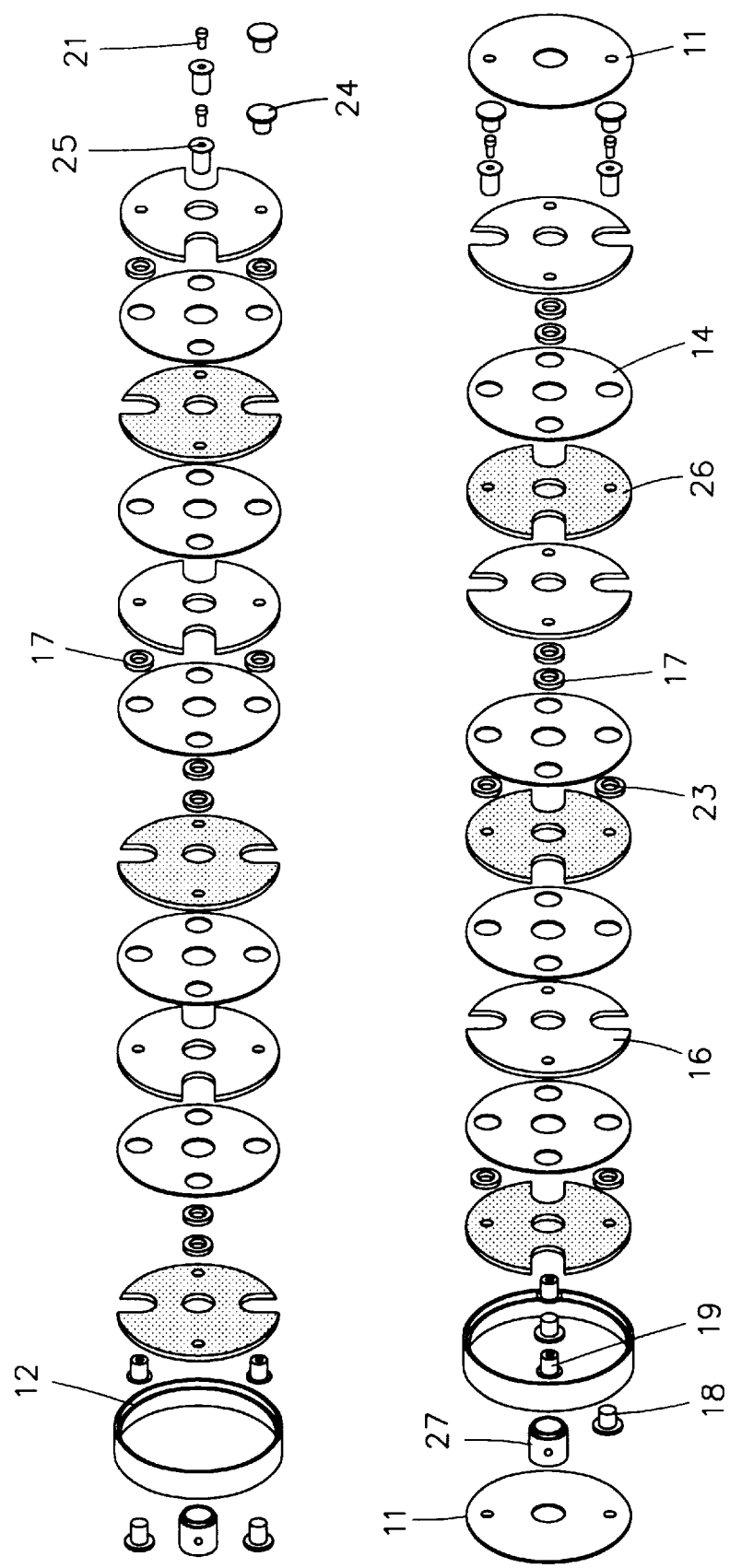
FIG. 3 is an exploded perspective view which illustrates the shapes of the elements and a disassembled state of the bipolar battery according to the present invention.

FIG. 3 illustrates the shapes of the elements and a disassembled state of the bipolar battery according to the present invention. As shown therein, the anodes 16, the separators 14, and the cathodes 26 each having a through hole at their center portion and a plurality of insertion holes at their peripheral portions are inserted into the interior of the outer ring 12, made of an insulator, so that the separators 14 are interposed between the cathodes 26 and the anodes 16. The electrolyte injection ring 27 having the electrolyte injection holes 15 formed at its lateral surfaces is inserted into the through holes formed at the center portions of the anodes 16, the cathodes 26, and the separators 14. The insertion hole of each anode 16 into which the cathode pin 25 is inserted has a u-shaped cutout larger than the insertion hole into which the anode pin 19 is inserted. Therefore, the cathode pin 25 is isolated from the anodes 16 by the u-shaped cutout of each anode. Each cathode 26 also has the same u-shaped cutout. Therefore, the anode pin 19 is isolated from the cathodes 26 for thereby preventing an electrical short circuit.

Next, the cathode contact ring 23 having a through hole formed at the center portion thereof is inserted into the insertion hole of the cathode into which the cathode pin 25 is inserted. In addition, the anode contact ring 17 is also inserted in the same fashion.

Therefore, the anodes 16 are connected with each other by the anode pin 19, and the cathodes 26 are connected with each other by the cathode pin 25. The electrodes are connected in parallel as many as the number of the arranged anodes 16 and the cathodes 26.

When stacking the bipolar cells in order to increase the voltage, the anode insulation member 18 and the cathode insulation member 24 at the engaging hole of the anode pin 19 and the cathode pin 25 see to it that the anode pin 19 and the cathode pin 25 in a cell do not concurrently electrically contact with the same collector.

Thereafter, the collector 11 is stacked on the anode 16 which is positioned in the uppermost portion. Therefore, it is possible to stack the bipolar cells for thereby increasing the voltage as many as the number of the stacked cells.

Figure 4:
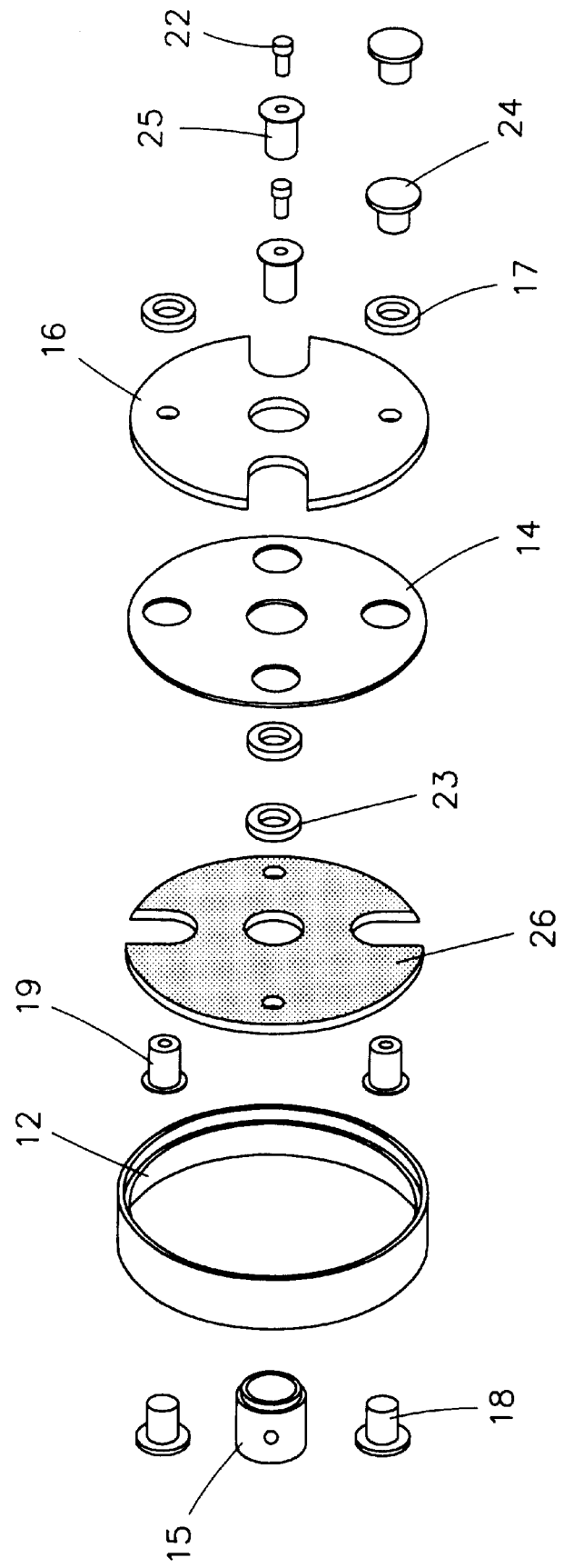
FIG. 4 is an exploded perspective view illustrating a part of the structure of FIG. 3.

FIG. 4 is an exploded perspective view illustrating a part of the structure of FIG. 3. As shown therein, when stacking the structure formed of the anode 16 and the cathode 26 isolated by the separator 14, the outer ring supporting the above-described stacking structure, and the anode 16 and the cathode 26 which are isolated by the separator 14 in multiple tier structures, each stacking structure includes an anode pin 19 and a cathode pin 25 connecting each anode 16 and cathode 26 respectively in parallel, an anode contact ring 17 providing an electrical contact between the anode pin 19 and the anode 16, a cathodes contact ring 23 supporting an electrical contact of the cathode pin 25 and the cathode 26, a cathode insulation member 24 and an anode insulation member 18 preventing the cathode pin 25 and the anode pin 19 in the same cell from being concurrently connected with the same collector when stacking the cells for increasing the voltage, an electrolyte injection ring 27 enabling injection of an electrolyte into the anodes 16 and the cathodes 26, and a connection screw 21 connecting the engaging hole formed in the cathode pin 25 of the upper cell and the engaging hole formed in the anode pin 19 of the lower cell when stacking the cells.

Therefore, in the present invention, it is possible to obtain a plurality of parallel connections by connecting the anodes 16 and the cathodes 26 in a bipolar cell. In addition, it is possible to obtain a plurality of serial connections of parallelly connected cells by connecting the cells using the connection screws 21 and thereby easily increasing the current capacity and voltage.

As described above, in the bipolar battery according to the present invention, a plurality of anodes and cathodes, which are isolated by the separators are alternately stacked in the cell. The accordingly stacked anodes and cathodes are connected for thereby obtaining a plurality of parallel connections in the cell and increasing the current capacity. In addition, the collector of each cell serves as a case by minimizing the flow of the electrolyte between the cells for thereby minimizing the size and weight of the battery.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A bipolar battery, comprising:
   a stackable cell including:
   a plurality of anodes and cathodes alternately stacked and isolated by separators with a through hole being formed at a center portion of each of the anodes and cathodes, and with a plurality of insertion holes being formed at peripheral portions of the anodes and cathodes;
   an anode connection means and a cathode connection means inserted into the insertion holes of the anodes and cathodes for selectively connecting the anodes and the cathodes;
   a cathode insulation means formed on top of the cathode connection means and an anode insulation means formed at a bottom of the anode connection means;

an outer support means for supporting the stacked anodes and cathodes at an outer portions thereof;

an electrolyte injection means inserted into the through holes of the anodes, cathodes and separators for injecting an electrolyte into the stacked anode and cathode structure; and a collector supported by the outer support means and the electrolyte injection means and stacked on top of the anode positioned on the uppermost portion of the stacked anode and cathode structure and on top of the cathode insulation means and anode connection means, whereby a predetermined number of said cells may be stacked.

2. The battery according to claim 1, wherein said anode connection means includes:

a conductive anode contact ring inserted into an insertion hole having a larger size among the insertion holes of the cathodes and having an engaging hole formed at a center portion thereof; and an anode conductive pin inserted into the insertion hole of the anodes and the insertion hole of the anode contact ring and having an engaging hole formed at a center portion thereof.

3. The battery according to claim 1, wherein said cathode connection means includes:

a conductive cathode contact ring inserted into an insertion hole having a larger size among the insertion holes of the anodes and having an engaging hole formed at a center portion of the same; and a cathode conductive pin inserted into the insertion hole of the cathodes and the insertion hole of the cathode contact ring and having an engaging hole formed at a center portion thereof.

4. The battery according to claim 1, wherein said electrolyte injection means includes a cylindrical member having electrolyte injection holes formed at a lateral surface thereof.

5. The battery according to claim 1, wherein in said stacked structure of the cells, the cathode connection means and cathode insulation means of an upper cell are placed on the top of the anode connection means and anode insulation means of a lower cell, and the cathode connection means of the upper cell and the anode connection means of the lower cell are connected by a connection screw.

* * * * *